(12) United States Patent
West et al.

(10) Patent No.: US 10,412,900 B2
(45) Date of Patent: Sep. 17, 2019

(54) IMPLEMENT SYSTEM FOR A MACHINE

(71) Applicant: Progress Rail Services Corporation, Albertville, AL (US)

(72) Inventors: Kevin Lynn West, Clanton, AL (US); Mark T Plyler, Notasulga, AL (US); Richard David Mills, Bishop, GA (US)

(73) Assignee: Progress Rail Services Corporation, Albertville, AL (US)

( * ) Notice: Subject to any disclaimer, the term of this patent is extended or adjusted under 35 U.S.C. 154(b) by 188 days.

(21) Appl. No.: 15/499,969

(22) Filed: Apr. 28, 2017

(65) Prior Publication Data

US 2018/0310485 A1 Nov. 1, 2018

(51) Int. Cl.
*A01G 3/04* (2006.01)
*A01G 23/091* (2006.01)
*A01G 23/095* (2006.01)
*A01G 23/08* (2006.01)

(52) U.S. Cl.
CPC .............. *A01G 3/04* (2013.01); *A01G 23/091* (2013.01); *A01G 23/095* (2013.01); *A01G 23/08* (2013.01)

(58) Field of Classification Search
CPC .... A01G 23/08; A01G 23/081; A01G 23/083; A01G 23/085; A01G 23/087; A01G 23/089; A01G 23/09; A01G 23/091; A01G 23/093; A01G 23/095; A01G 23/099; A01G 3/04; A01G 3/0426; B66C 23/04; B66C 23/701; B66C 23/703; B66C 23/705; B66C 23/706; B66C 23/707

USPC .................. 212/347, 348; 414/687, 689, 682
See application file for complete search history.

(56) References Cited

U.S. PATENT DOCUMENTS

| 4,411,070 | A | * | 10/1983 | Boyum | ..................... A01G 3/08 144/24.13 |
|---|---|---|---|---|---|
| 4,522,239 | A | | 6/1985 | Gaitten | |
| 4,627,227 | A | | 12/1986 | Dixon | |
| 4,634,106 | A | * | 1/1987 | LaBate, II | ............ C21C 5/4653 222/597 |
| 5,735,337 | A | | 4/1998 | Edwards | |
| 7,367,368 | B2 | | 5/2008 | Smitherman | |
| 7,640,091 | B2 | | 12/2009 | Berg et al. | |
| 8,419,340 | B2 | * | 4/2013 | Ogawa | .................. E02F 3/4136 212/294 |
| 2005/0220588 | A1 | * | 10/2005 | Turnbull | ................. B66F 9/065 414/467 |
| 2015/0068644 | A1 | | 3/2015 | Schmotter et al. | |

FOREIGN PATENT DOCUMENTS

| DE | 3731496 | 4/1989 |
|---|---|---|
| DE | 202008016888 | 3/2009 |

* cited by examiner

*Primary Examiner* — Matthew Katcoff
(74) *Attorney, Agent, or Firm* — Bookoff McAndrews

(57) ABSTRACT

An implement system for a machine. The implement system includes a boom, an implement, a roller assembly and a carriage. The boom has a telescopic structure and a first end. The implement is coupled to the first end of the boom. The roller assembly is configured to be coupled to the machine. The carriage is engaged with the roller assembly and is coupled to the boom. The carriage is configured to move linearly along a longitudinal axis of the machine between a first position and a second position.

20 Claims, 16 Drawing Sheets

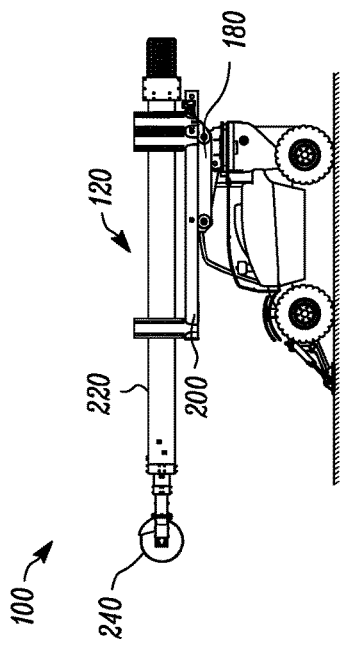
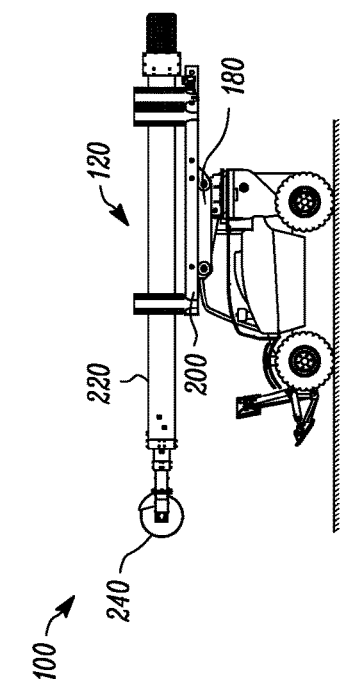
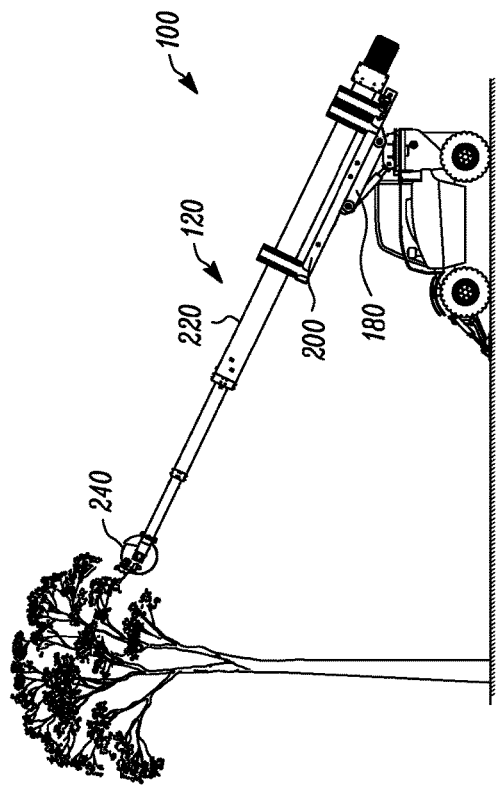
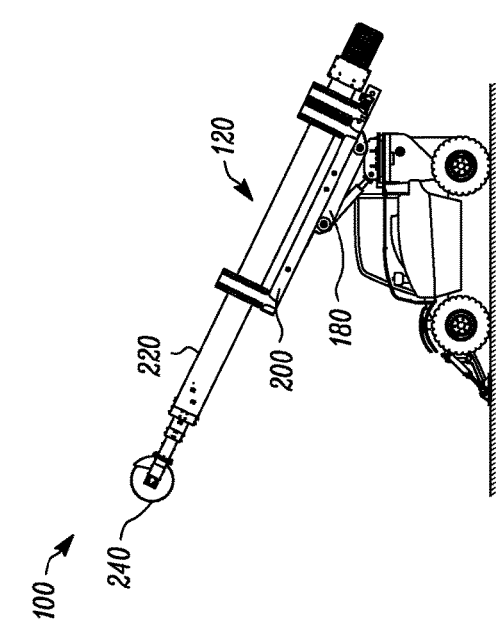

IMPLEMENT SYSTEM FOR A MACHINE

TECHNICAL FIELD

The present disclosure generally relates to a machine. More particularly, the present disclosure relates to an implement system for a tree trimming machine.

BACKGROUND

Tree trimming machines may be used for trimming of limbs and for pruning of small branches from trees. A variety of tree-trimming apparatus have been developed for clearing tree branches and other vegetation. One way to trim the tree branches is to employ trimming machines having a boom. Generally, such machines have a cutting device coupled to an end of the boom. However, in restrictive areas, such as residential yards, municipal streets, golf courses, etc., trimming vegetation via the large tree trimming machine may not be possible. For example, the large tree trimming machines that support conventional extended-boom mounted cutting devices may not be able to access vegetation surrounding power lines that are located along a roadway or near residential plots. Accordingly, there is a need for a compact mobile tree-trimming apparatus with a small footprint to access the restrictive areas.

U.S. Pat. No. 4,522,239 relates to an apparatus for trimming limbs of trees. U.S. Pat. No. 4,522,239 discloses a telescoping boom assembly mounted on a rear frame of a machine. The telescoping boom assembly includes an inner telescoping boom and an outer telescoping boom. A limb cutting assembly is connected to a free end of the inner telescoping assembly such that the limb cutting assembly can turn about the longitudinal axis of the telescoping boom.

SUMMARY OF THE INVENTION

In an aspect of the present disclosure, an implement system for a machine is disclosed. The implement system includes a boom, an implement, a roller assembly and a carriage. The boom has a telescopic structure and a first end. The implement is coupled to the first end of the boom. The roller assembly is configured to be coupled to the machine. The carriage is engaged with the roller assembly and is coupled to the boom. The carriage is configured to move linearly along a longitudinal axis of the machine between a first position and a second position.

In another aspect of the present disclosure, a machine is disclosed. The machine includes a boom having a telescopic structure, the boom having a first end, an implement coupled to the first end of the boom, a frame having a rear end, a roller assembly coupled to the rear end of the frame and a carriage engaged with the roller assembly and coupled to the boom. The carriage is configured to move linearly along a longitudinal axis of the machine between a first position and a second position.

In yet another aspect of the present disclosure, a method for retrofitting a pre-existing machine is disclosed. The pre-existing machine has a pre-existing boom coupled to a rear end of the pre-existing machine. The method includes removing the pre-existing boom from the rear end of the pre-existing machine and mounting an implement system to the rear end of the pre-existing machine. The step of mounting the implement system includes mounting a roller assembly to the rear end of the pre-existing machine, slidably engaging a carriage with the roller assembly such that the carriage is configured to move along a longitudinal axis of the pre-existing machine between a first position and a second position and coupling the boom to the carriage.

BRIEF DESCRIPTION OF THE DRAWINGS

FIG. 14 illustrates the machine wherein the assembly of the carriage, the boom and the implement is in its rear-most position;

FIG. 15 illustrates the machine wherein the assembly of the carriage, the boom and the implement is in its forward-most position;

FIG. 16 illustrates the machine wherein the second hydraulic cylinder is in the extended position and the assembly of the carriage, the boom and the implement is moved along a vertical direction;

FIG. 17 illustrates the machine operating at the worksite to perform a trimming/cutting operation;

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
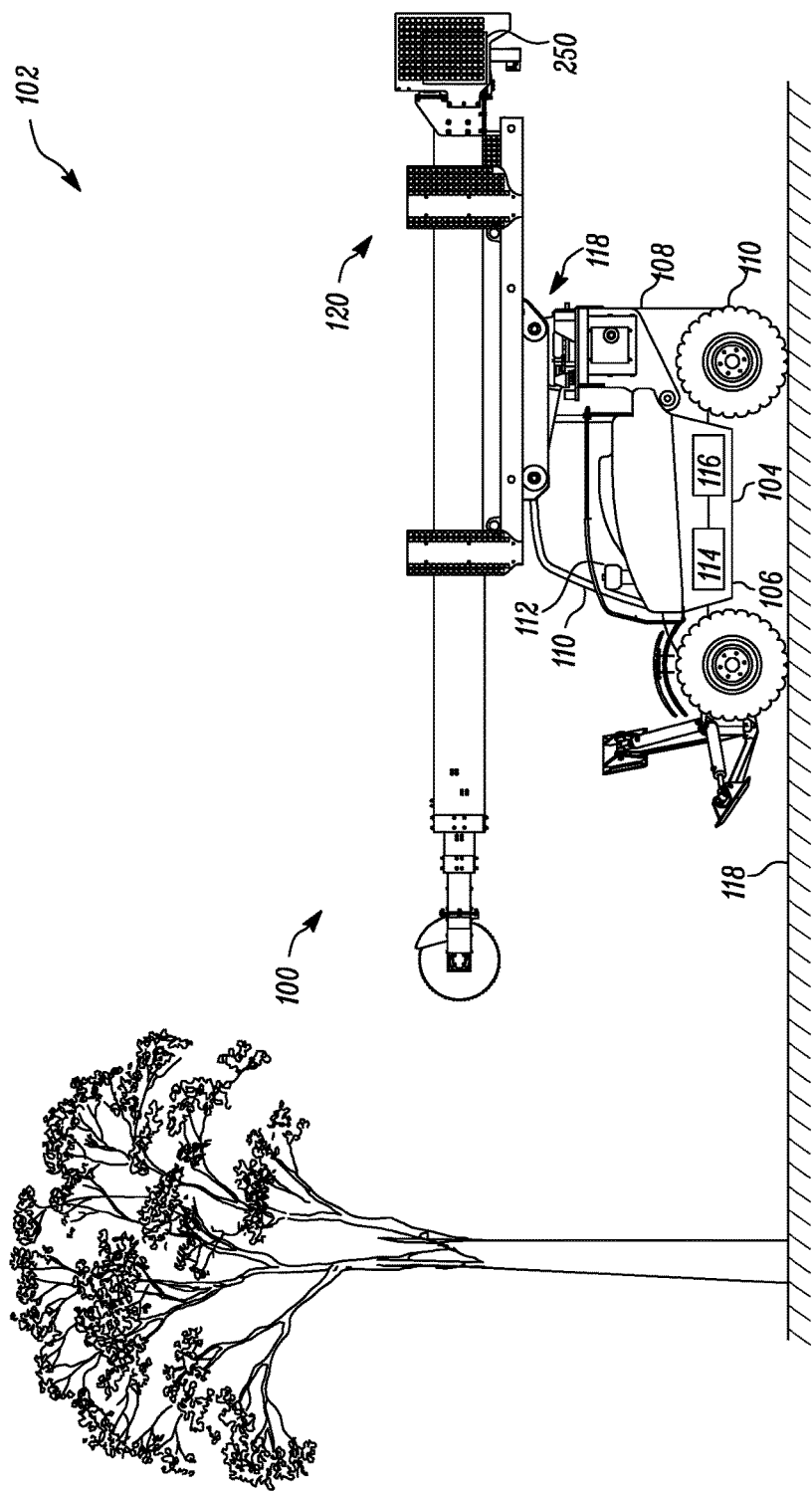
FIG. 1 is a diagrammatic illustration of an exemplary machine working at a worksite.

With reference to FIG. 1, an exemplary machine 100 operating at a work site 102 is depicted, in which embodiments of the present disclosure may be implemented. As, shown in FIG. 1, the machine 100 is embodied in the form of a tree trimming machine. The machine 100 may be used for cutting/trimming/clearing vegetation. For example, the machine 100 of the present disclosure may be employed for clearing tree branches. In another example, the machine 100 may be configured to trim limbs of trees and to prune small branches from trees.

Although the exemplary machine 100 is embodied as a tree trimming machine in the illustrated embodiment of FIG. 1, it will be appreciated that the machine 100 may any vehicle having a cutting/trimming/pruning device. In the embodiment illustrated, the machine 100 is an operator operated machine. However, in various other embodiments, the machine 100 may be a machine have varying levels of autonomy. For instance, the machine 100 may be a semi-autonomous machine, remotely operated machine, or remotely supervised machine.

The machine 100 includes a frame 104. The frame 104 has a front end 106 and a rear end 108. The frame 104 is configured to provide a supporting structure to which all other components are attached/coupled/mounted.

The machine 100 further includes an operator station 110 and multiple ground engaging members 111 for e.g., wheels as shown in FIG. 1. The operator station 110 is mounted on the frame 104. The operator station 110 may include an operational system 112 configured to actuate a particular mode of operation for the machine 100. With regards to the exemplary machine 100 of FIG. 1, the machine 100 may have a two of modes of operation such as a working mode or a travelling mode.

The machine 100, as illustrated in FIG. 1, may further include a drive system 114, a transmission system 116. The drive system 114 may include an engine (not shown), an electric motor for e.g., a traction motor (not shown), or both. The transmission system 116 may include gears, differential systems, axles, and other components (not shown) that are coupled to the drive system 114 and the ground engaging members 111 of the machine 100. The transmission system 116 is configured to transfer power from the drive system 114 to the ground engaging members 111 and hence, propel the machine 100 on a work surface 118 of the work site 102.

The machine 100 may further include an attachment means (not shown) provided at the rear end 108 of the frame 104. An implement system 120 is coupled to the attachment means. The implement system 120 includes a slew bearing assembly 140, a coupling structure 160, a roller assembly 180, a carriage 200, a boom 220 and an implement 240, as illustrated in FIG. 2 and FIG. 3.

Figure 2:
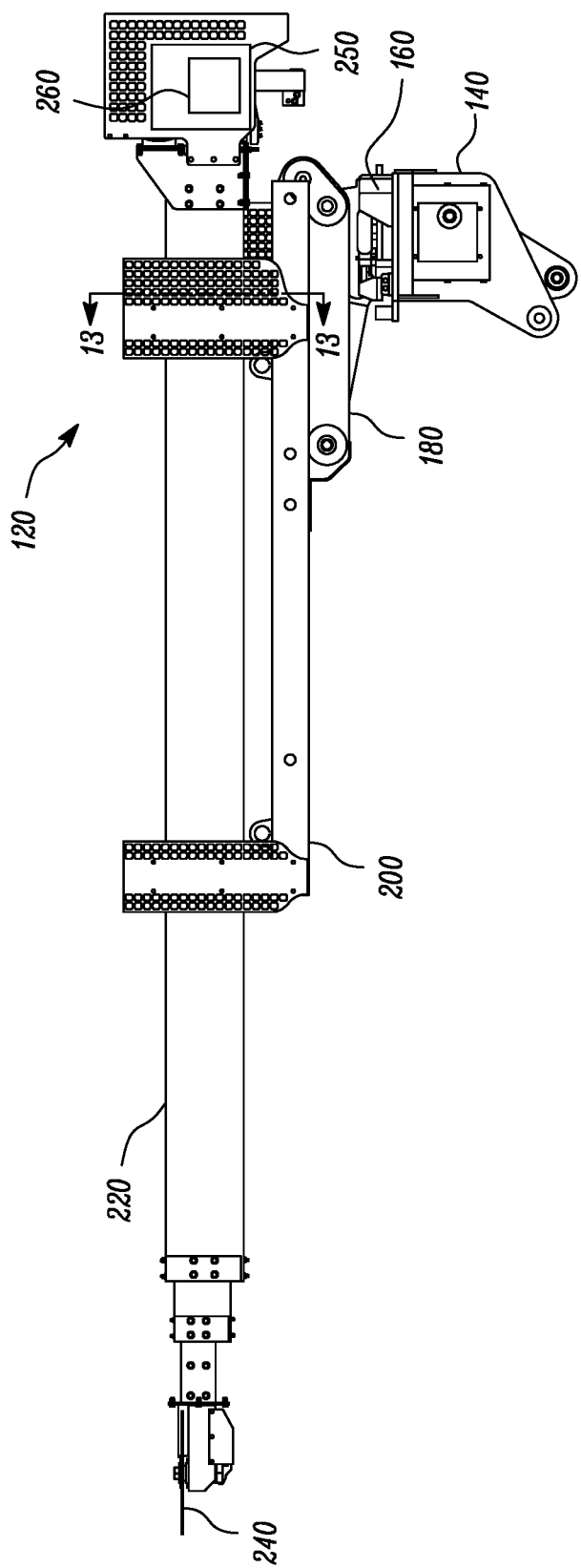
FIG. 2 illustrates an implement system of the exemplary machine as disclosed in FIG. 1.
Figure 4:
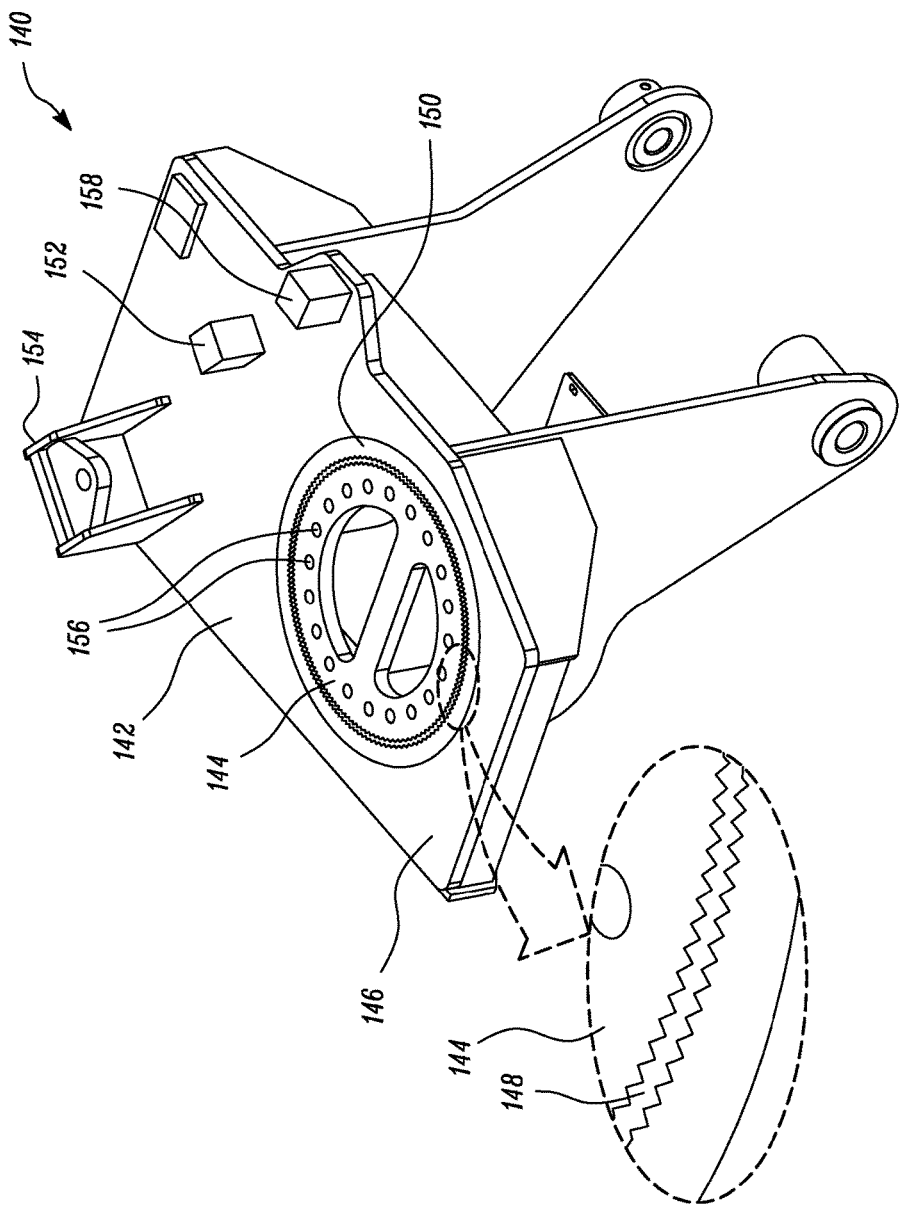
FIG. 4 illustrates a perspective view of a slew bearing assembly used in the implement system in accordance with an embodiment of the present disclosure.
Figure 5:
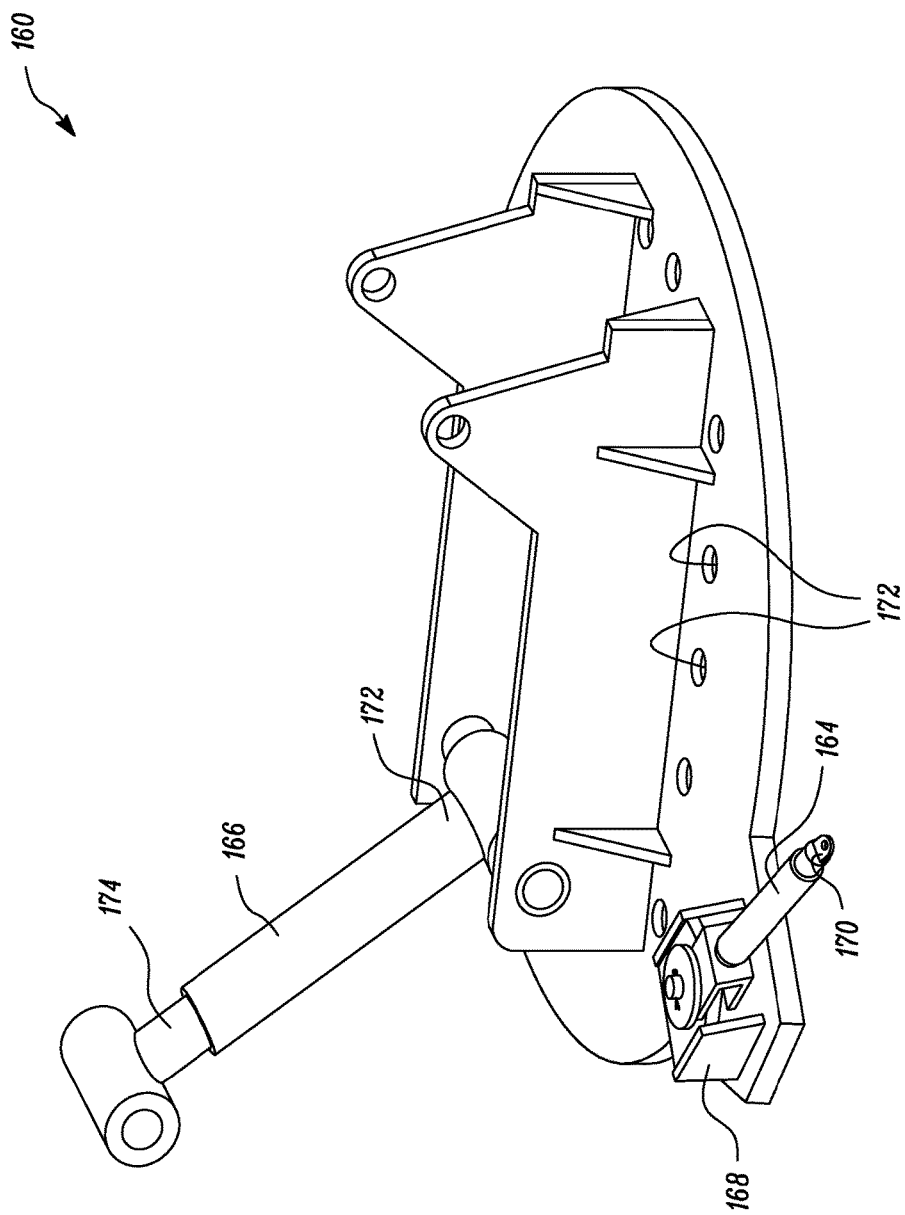
FIG. 5 illustrates a perspective view of a coupling structure used in the implement system in accordance with an embodiment of the present disclosure.

The slew bearing assembly 140 is mounted on the rear end 108 of the frame 104, as shown in FIG. 2. Referring to FIG. 4, the slew bearing assembly 140 includes a slew mount assembly 142 and a slew ring 144. The slew mount assembly 142 is coupled to the attachment means provided at the rear end 108 of the frame 104. The slew mount assembly 142 includes a mounting surface 146. The mounting surface 146 includes an aperture 148 having a shape similar to that of the slew ring 144. In the embodiment illustrated, a rotatable ring 150 is disposed in the aperture 148 of the mounting surface 146. The rotatable ring 150 is configured to rotate within the mounting surface 146. Further, the rotatable ring 150 is sized such that it is of a size appropriate to receive the slew ring 144.

The slew ring 144 is placed inside the rotatable ring 150 such that the rotatable ring 150 engages with the slew ring 144 and allows the slew ring 144 to turn/rotate within the rotatable ring 150. In the embodiment illustrated, the slew ring 144 is a slew bearing that engages with an inner wall of the rotatable ring 150 to facilitate a turning/rotary movement of the slew ring 144. In other embodiments, the slew ring 144 may be a ring structure having a surface that interacts with the rotatable ring 150 to provide a turning/rotating movement of the slew ring 144.

Figure 3:
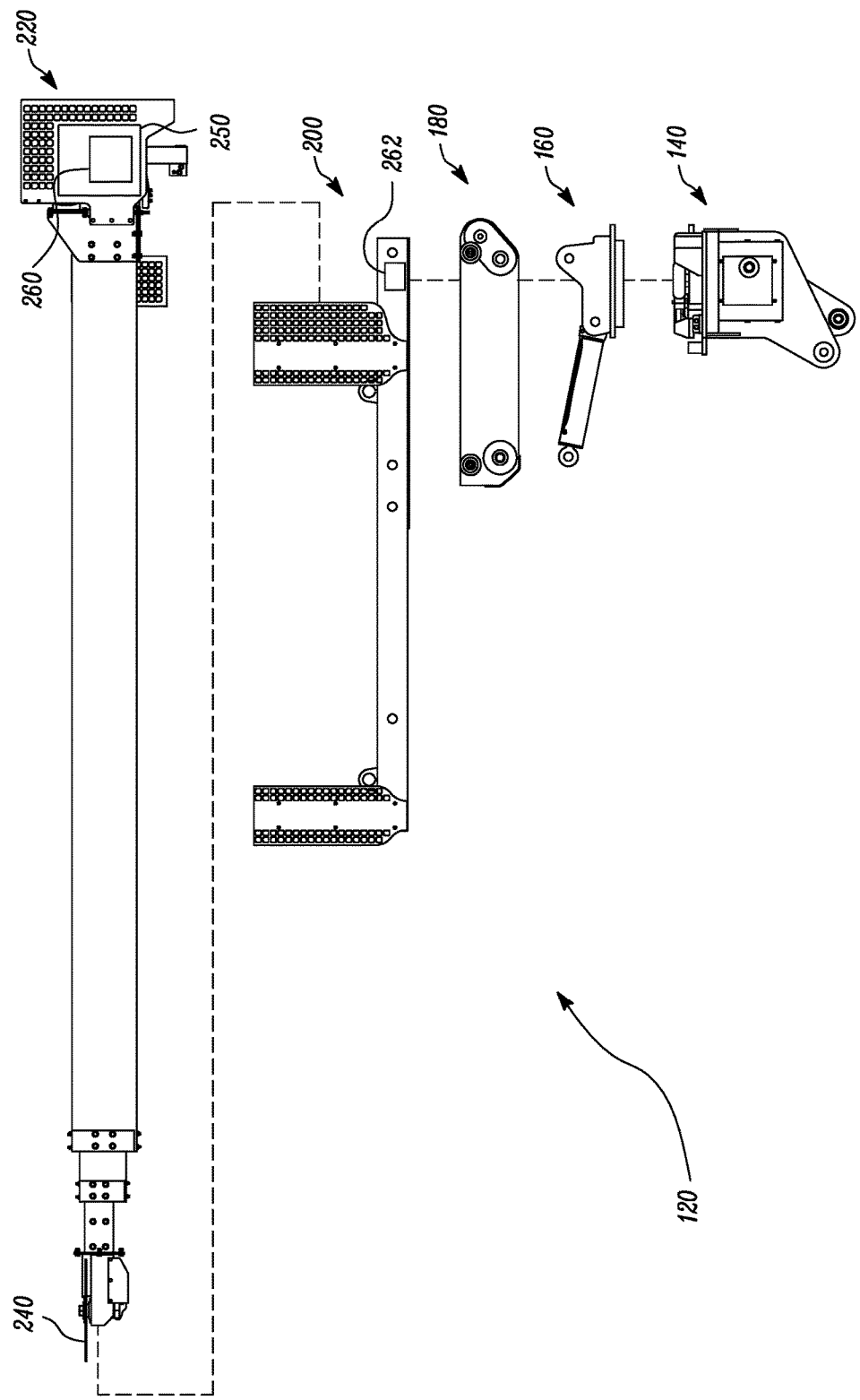
FIG. 3 illustrates an exploded view of components of the implement system.

Over the slew ring 144 the coupling structure 160 is provided, as shown in FIG. 2 and FIG. 3. The coupling structure 160 is coupled to the slew ring 144 such that the rotary motion of the slew ring 144 translates into rotary motion of the coupling structure 160. In the embodiment illustrated, the coupling structure 160 and the slew ring 144 include slots 171 and 156 respectively. The slots 156 and 171 are aligned and then through these aligned slots (156 and 171) a bolt is passed to secure the coupling structure 160 to the slew ring 144. It may be contemplated that, in other embodiments any other kind of securing means known in the art could be used to secure the coupling structure 160 to the slew ring 144 such that rotary motion of the slew ring 144 translates into rotary motion of the coupling structure 160.

The coupling structure 160 may have an articulation assembly configured to articulate the coupling structure 160 (and the assembled combination of the roller assembly 180, carriage 200, the boom 220 and the implement 240, as will be discussed later). For example, the coupling structure 160 may include a first hydraulic cylinder 164 and a second hydraulic cylinder 166. The first hydraulic cylinder 164 may be configured to move the coupling structure 160 (and the assembled combination of the roller assembly 180, carriage 200, the boom 220 and the implement 240, as will be discussed later) in a first direction. The second hydraulic cylinder 166 may be configured to move the coupling structure 160 (and the assembled combination of the roller assembly 180, carriage 200, the boom 220 and the implement 240, as will be discussed later) in a second direction.

Figure 6:
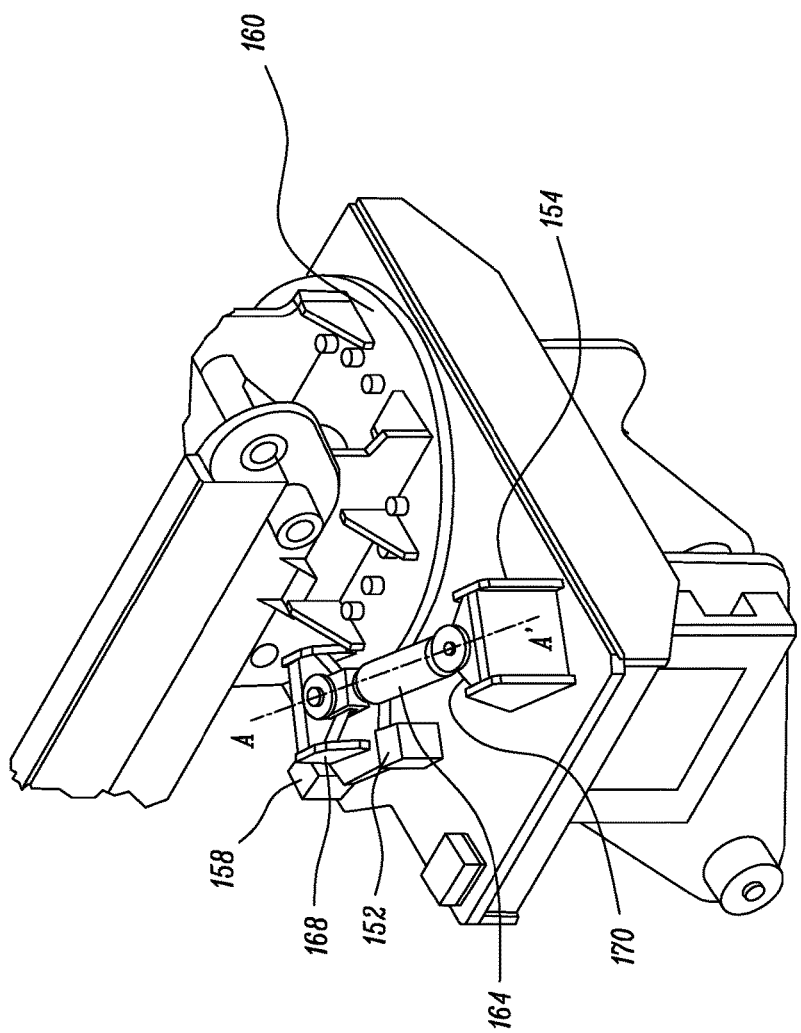
FIG. 6 illustrates a perspective view of the coupling structure coupled to the slew bearing assembly when a first hydraulic cylinder is in a retracted position.
Figure 7:
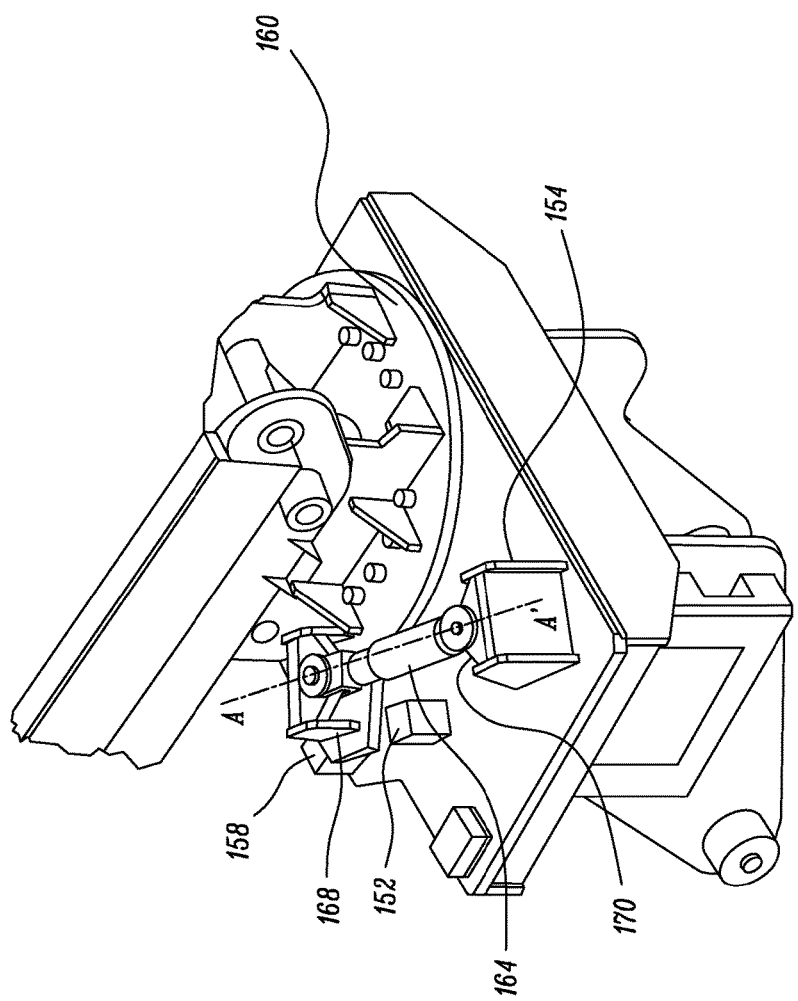
FIG. 7 illustrates a perspective view of the coupling structure coupled to the slew bearing assembly when the first hydraulic cylinder is in an extended position.

The first hydraulic cylinder 164 includes a first end 168 and a second end 170. The first end 168 is coupled to the coupling structure 160 and the second end 170 is coupled to a connector 154 provided on the mounting surface 146 of the slew mount assembly 142. In the embodiment illustrated, the first end 168 and the second end 170 of the first hydraulic cylinder 164 may be coupled to the coupling structure 160 and the connector 154 respectively via pins, bolts, or any other coupling means known in the art. The first hydraulic cylinder 164 is configured to move the coupling structure 160 in the first direction (the first direction corresponding to a rotational movement of the coupling structure 160). As illustrated in FIG. 6 and FIG. 7, a rod of the first hydraulic cylinder 164 extends and retracts, along direction A-A', to turn/rotate the coupling structure 160. The slew mount assembly 142 may also include a first stopper 152 and a second stopper 158 provided on the mounting surface 146. The first stopper 152 and the second stopper 158 are configured to restrict the rotational movement of the coupling structure 160. The first stopper 152 and the second stopper 158 ensure that the coupling structure 160 does not rotate more than the predetermined range. Thereby ensuring that the machine 100 and the assembled implement system 120 does not become unstable.

The second hydraulic cylinder 166 includes a cylinder end 172 and a rod end 174. The cylinder end 172 is coupled to the coupling structure 160 and the rod end 174 is configured to be coupled to the roller assembly 180. The cylinder end 172 of the second hydraulic cylinder 166 is connected to the coupling structure 160 via pins, bolts, or any other coupling means known in the art.

Figure 8:
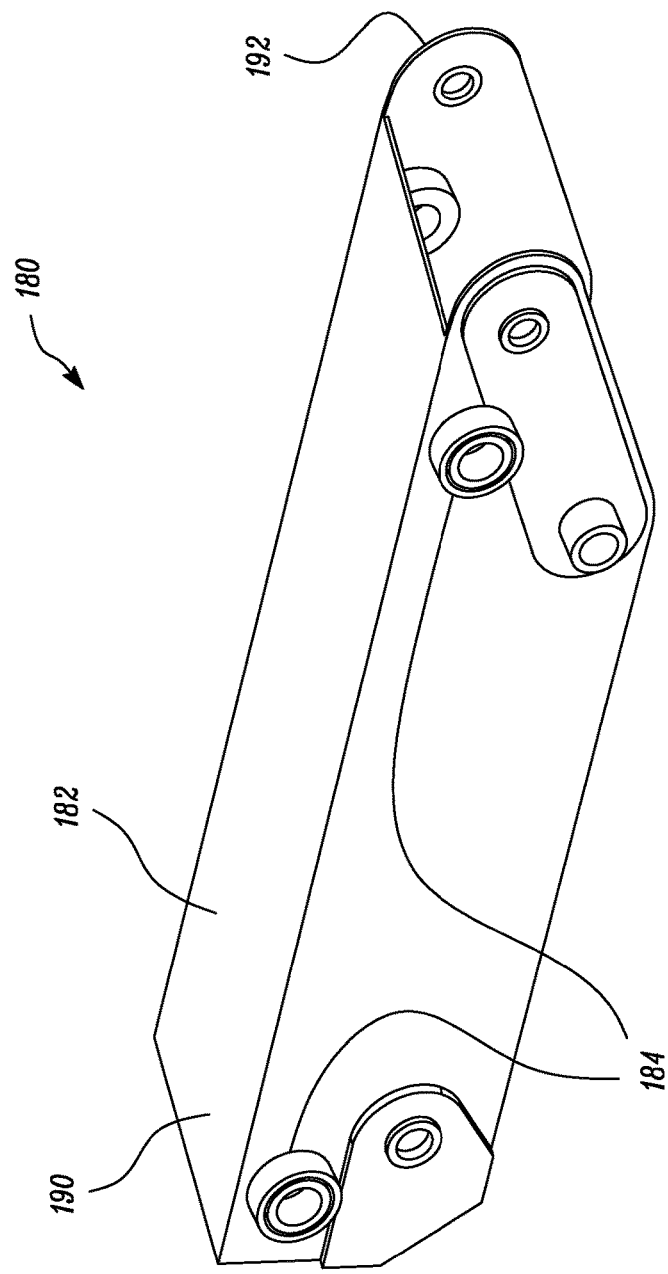
FIG. 8 illustrates a perspective view of a roller system used in the implement system in accordance with an embodiment of the present disclosure.
Figure 9:
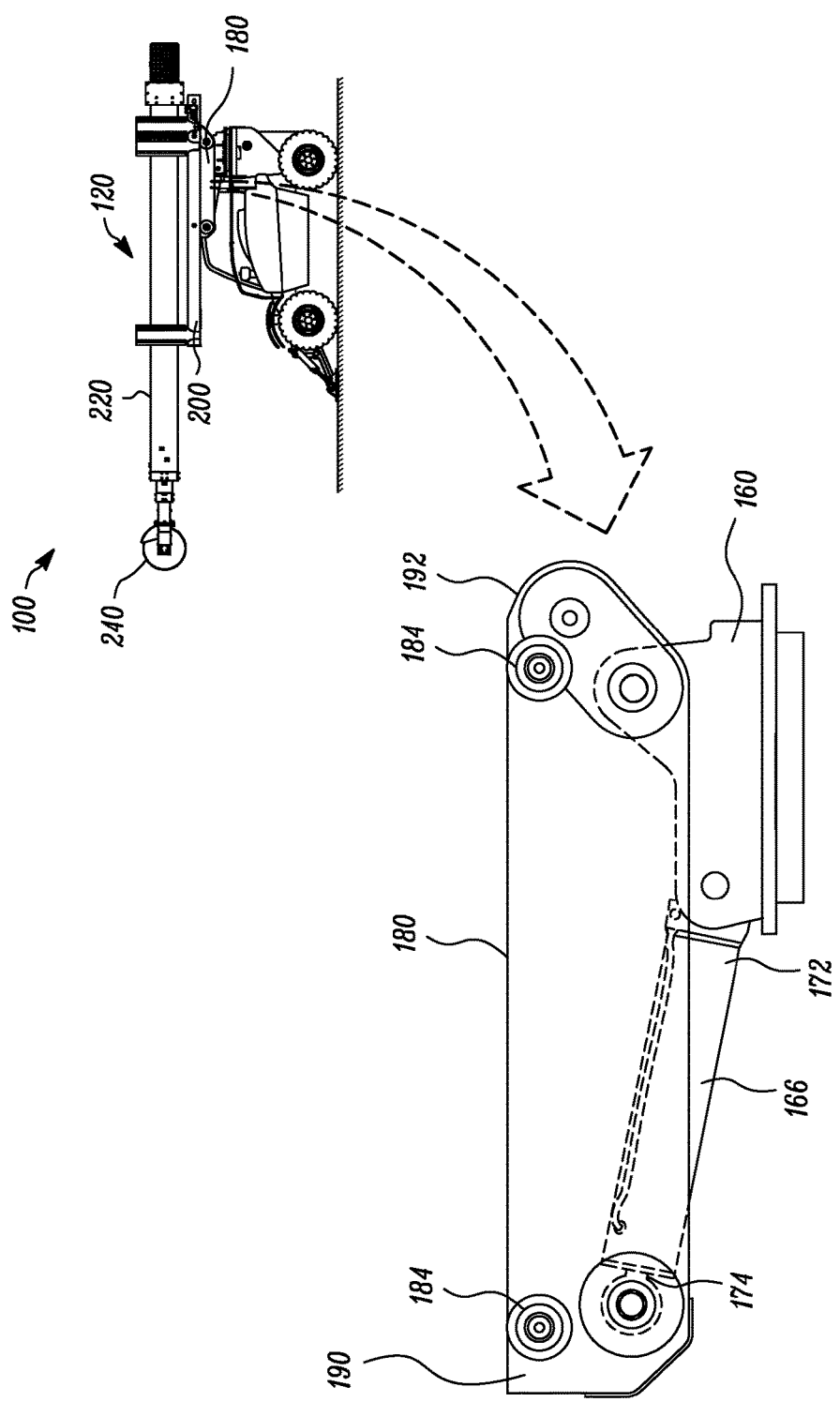
FIG. 9 illustrates the roller system coupled to the coupling structure when a second hydraulic cylinder is in a retracted position.
Figure 10:
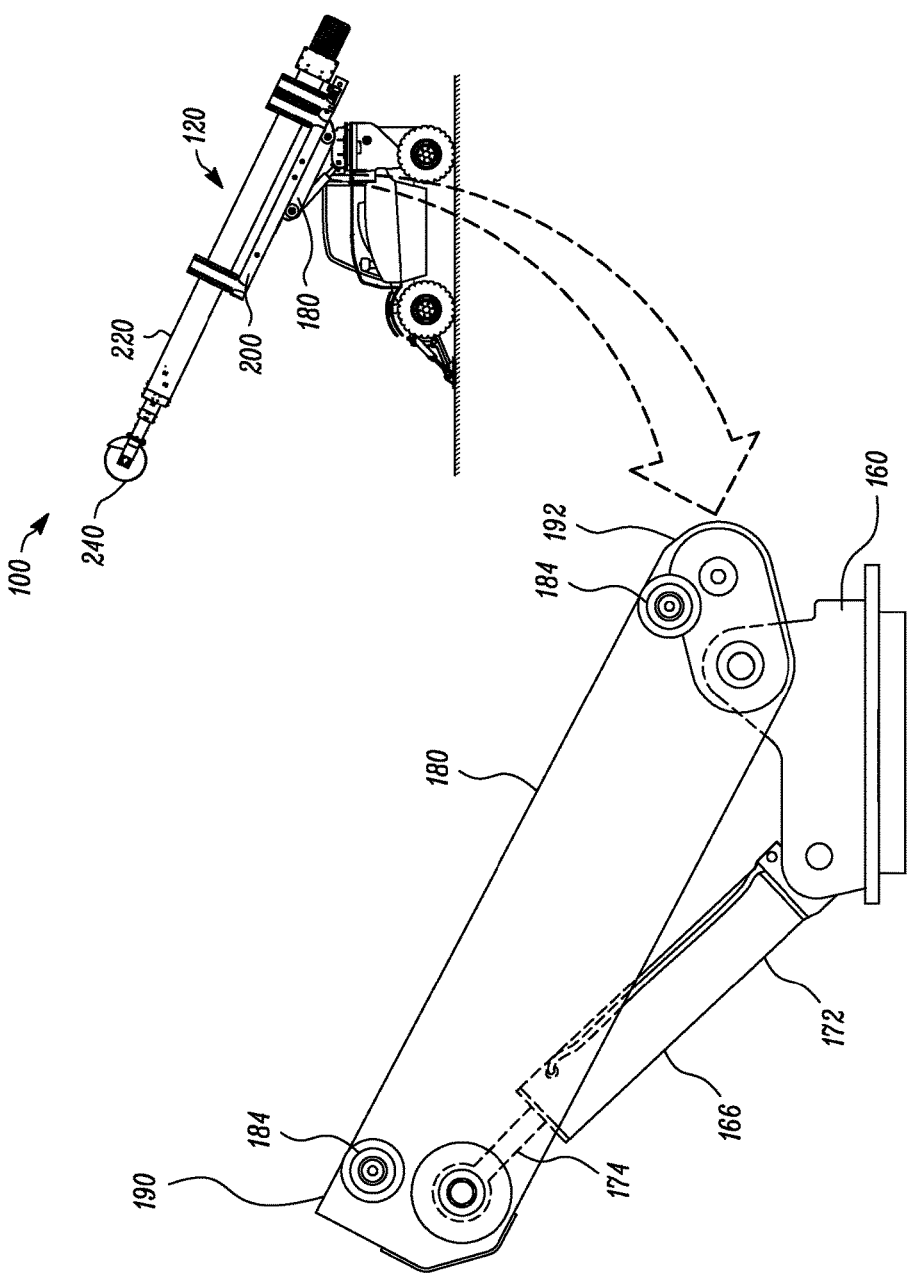
FIG. 10 illustrates the roller system coupled to the coupling structure when a second hydraulic cylinder is in an extended position.

The coupling of the roller assembly 180 with the rod end 174 and the coupling structure 160 will now be explained in detail with reference to FIGS. 3 and 8-10. As shown in FIG. 3, the roller assembly 180 is disposed over the coupling structure 160. Referring to FIGS. 8-10, the roller assembly 180 includes a front zone 190 and a rear zone 192. The front zone 190 of the roller assembly 180 is coupled to the rod end 174 of the second hydraulic cylinder 166 and the rear zone 192 of the roller assembly 180 is pivotably coupled to the coupling structure 160. Thus, when a rod extends or retracts relative to a cylinder of second hydraulic cylinder 166, the rod end 174 pivotably moves the roller assembly 180 about the pivotable connection at the rear zone 192 such that the front zone 190 of the roller assembly 180 moves in a vertical direction, as illustrated in FIG. 9 and FIG. 10.

Referring to FIG. 8, the roller assembly 180 includes a support structure 182. The support structure 182 is a box shaped structure. The roller assembly 180 may further includes a plurality of rollers 184 disposed on the support structure 182.

Figure 11:
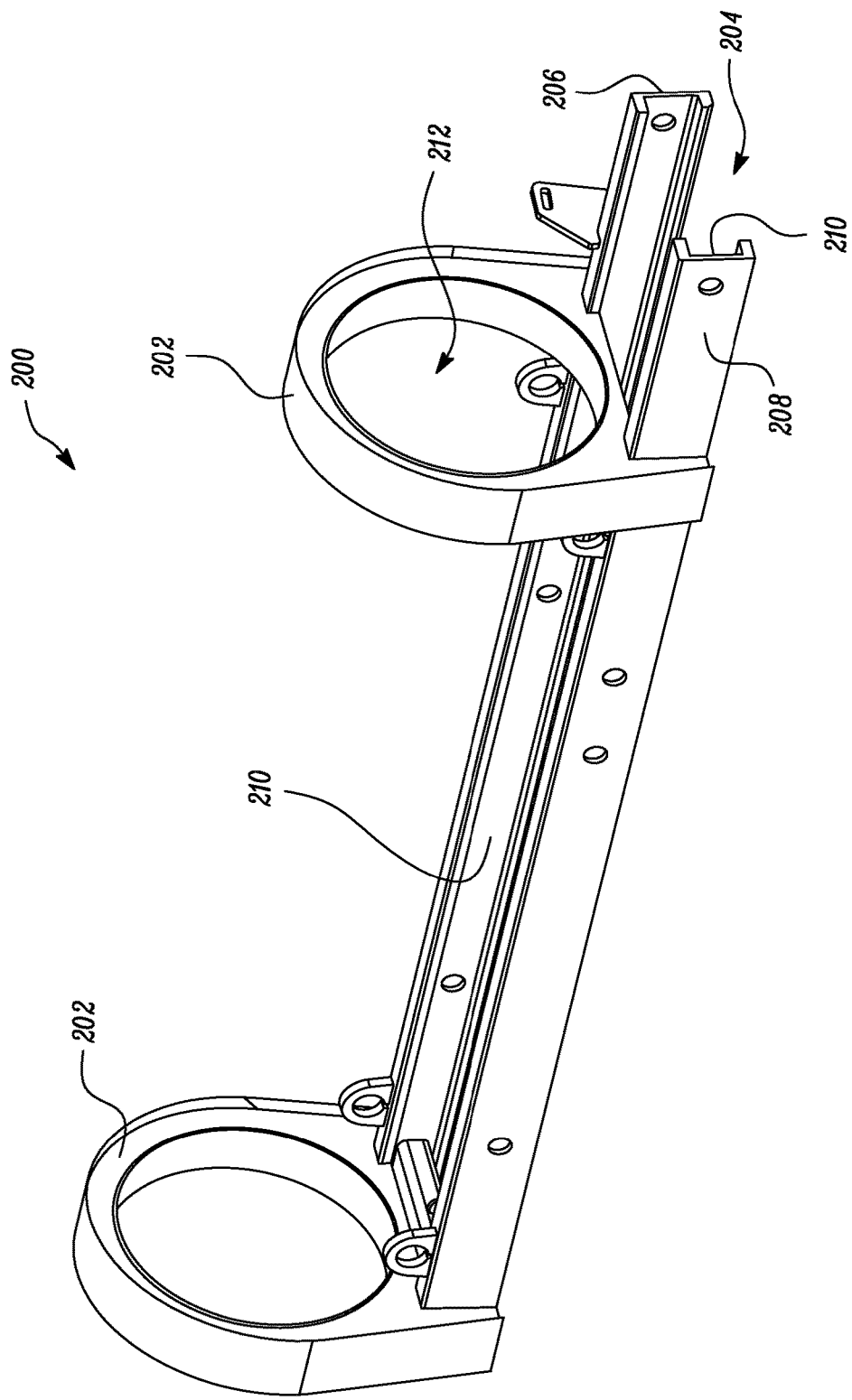
FIG. 11 illustrates a perspective view of a carriage used in the implement system in accordance with an embodiment of the present disclosure.
Figure 12:
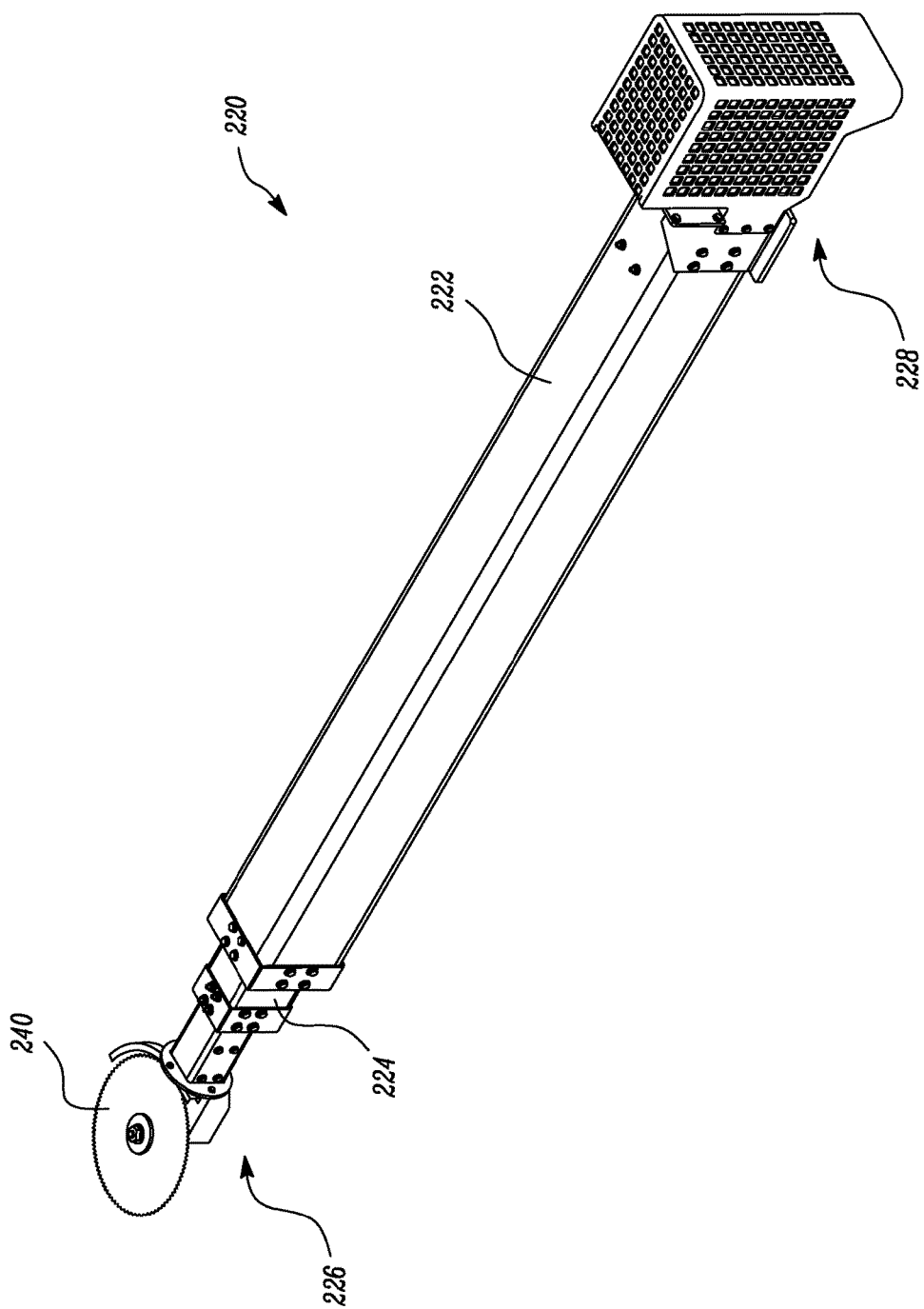
FIG. 12 illustrates a perspective view of a boom having an implement coupled to the boom.

As illustrated in FIG. 2, the carriage 200 is securely placed over the roller assembly 180. The carriage 200 is configured to slide over the roller assembly 180 and move linearly along a longitudinal axis of the machine 100, as illustrated in FIGS. 14 and 15. Referring to FIG. 11, the carriage 200 includes an annular structure 202 and a sliding assembly 204. The sliding assembly 204 includes a first arm 206 and a second arm 208. The first arm 206 and the second arm 208 have U shaped structures that define an passageway/guide rails 210.

The guide rails 210 of the first arm 206 and the second arm 208 receive the plurality of rollers 184 of the roller assembly 180 such that the first arm 206 and second arm 208 can slide over the roller assembly 180. The sliding action of the first arm 206 and the second arm 208 facilitates the linear movement of the carriage 200 over the roller assembly 180. The carriage 200 may be slid forward/rearward towards the front end 106/rear end 108 of the frame 104. The forward-most position of the carriage 200 corresponds to a first position of the carriage 200 and the rear-most position of the carriage 200 corresponds to a second position of the carriage 200, as shown in FIG. 15 and FIG. 14 respectively.

Referring to FIG. 11, the carriage 200 has annular structures 202 (two annular structures 202). In the embodiment illustrated, two annular structures 202 are illustrated, however, it may be contemplated that there may be three or more than three annular structures 202. The annular structures 202 form openings 212 to receive the boom 220. The boom 220 has a first end 226 and a second end 228. The boom 220 is a telescopic structure having an outer boom section 222 provided at the second end 228 and an inner boom section 224 provided at the first end 226. The inner boom section 224 is configured to telescopically extend from the outer boom section 222 along the longitudinal axis of the boom 220. In the embodiment illustrated, the boom 220 includes only two sections. However, it may be contemplated that the boom 220 may have three or more sections depending on the requirements of the machine 100 and the operation to be performed at the work site 102.

As discussed above, the boom 220 has the outer boom section 222 and the inner boom section 224. The telescopic movement of the inner boom section 224 from the outer boom section 222 may be accomplished by a boom hydraulic cylinder (not shown). One end of the boom hydraulic cylinder is coupled to the inner boom section 224 and the opposite end of the boom hydraulic cylinder is coupled to the outer boom section 222. In other embodiments, the boom 220 may have other means to facilitate the telescoping movement of the inner boom section 224 with respect to the outer boom section 222.

The implement 240 is coupled to the inner boom section 224 of the boom 220. The implement 240 may be a rotary cutting tool having blades. The blades may be configured to rotate and trim/cut/prune vegetation/tree branches or limbs etc. In other embodiments, the implement 240 may be any tool having sharp edges from that moves in a rotary manner or oscillates linearly to provide a cutting action.

The assembled combination of the carriage 200, the boom 220 and the implement 240, as disclosed above, may be slid forward or rearward via movement of the slidable carriage 200 over the roller assembly 180. The carriage 200 is slid to forward-most position, as illustrated in FIG. 15, when the machine 100 is in the working mode of operation. The carriage 200 is slid to rearward-most position (such that assembly of the carriage 200, boom 220 and implement 240 is centrally positioned on the machine 100), as illustrated in FIG. 15, when the machine 100 is in the travel mode of operation. Further, the assembled combination of the coupling structure 160, the roller assembly 180, the carriage 200, the boom 220 and the implement 240, as disclosed above, may be moved in the first direction and the second direction by actuating the first hydraulic cylinder 164 and the second hydraulic cylinder 166 respectively (as illustrated in FIG. 6-7 and FIG. 9-10).

The implement system 120 may further include an implement control system 250, as shown in FIG. 2. The implement control system 250 may further include a controller 260, as illustrated in FIG. 3. The controller 260 may be operably coupled to the first hydraulic cylinder 164, the second hydraulic cylinder 166 and the boom hydraulic cylinder (not shown). The controller 260 is configured to actuate one or more of the first hydraulic cylinder 164, the second hydraulic cylinder 166 and the boom hydraulic cylinder, upon receipt of operator instructions. The operator station 110 may have a control panel having a plurality of switches configured to activate the movement of the first hydraulic cylinder 164, the second hydraulic cylinder 166 and the boom hydraulic cylinder (not shown).

The implement control system 250 and the controller 260 are configured to control the movement of the first hydraulic cylinder 164. Thereby, controlling the movement of the assembled combination of roller assembly 180, carriage 200, boom 220 and the implement 240 in a lateral direction with respect to the longitudinal axis of the boom 220, as shown in FIG. 6 and FIG. 7. The implement control system 250 and the controller 260 are further configured to control the movement of the second hydraulic cylinder 166. Thereby, controlling the movement of the assembled combination of roller assembly 180, carriage 200, boom 220 and the implement 240 in a vertical direction with respect to the longitudinal axis of the slew bearing assembly 140, as shown in FIG. 9 and FIG. 10. The implement control system 250 and the controller 260 are also configured to control the movement of the boom hydraulic cylinder. Thereby, controlling the telescoping movement of the boom 220 along the longitudinal axis of the boom 220.

Referring to FIG. 3, the carriage 200 has a sensor 262 disposed on it. The controller 260 is communicably coupled to the sensor 262 provided on the carriage 200. The sensor 262 may be a proximity sensor configured to determine the position of the carriage 200. The determined position may then be transmitted to a controller 260. The controller 260 may then receive the determined position and establish whether the determined position is the first position (the forward-most position as illustrated in FIG. 15). In case, the controller 260 establishes that the determined position is the second position, the controller 260 allows the second hydraulic cylinder 166 to move thereby allowing vertical movement of the assembled combination of implement 240, boom 220, carriage 200 and roller assembly 180. In case, the controller 260 establishes that the determined position is a position other than the second position, the controller 260 prevents the second hydraulic cylinder 166 to move thereby preventing any vertical movement of the assembled combination of implement 240, boom 220, carriage 200 and roller assembly 180.

Figure 13:
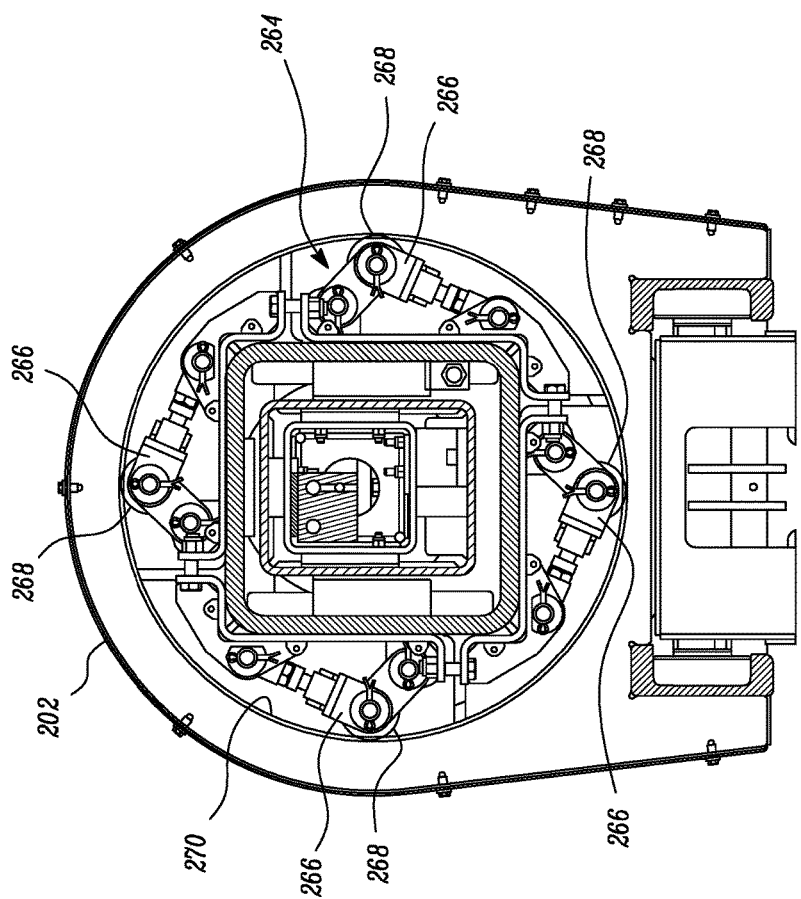
FIG. 13 illustrates a cross sectional of the implement system as illustrated in FIG. 2 along plane 13-13'.

FIG. 13 illustrates a sectional view of the implement system 120 along axis 13-13'. The implement system 120 further includes a coupling assembly 264 disposed between the annular structure 202 of the carriage 200 and the boom 220. The coupling assembly 264 is configured to engage with the annular structure 202 such that the boom 220 rotates about a longitudinal axis of the boom 220. The coupling assembly 264 includes a plurality of coupling linkages 266. Each of the plurality of coupling linkages 266 includes a rolling device 268. The plurality of coupling linkages 266 are coupled to the boom 220 in such a manner that each rolling device 268 of the plurality of coupling linkages 266 engages with an internal surface 270 of the annular structure 202. The coupling assembly 264 may also include an actuator (for example a motor, not shown) to provide a turning moment to the boom 220. When the turning moment is provided to the boom 220, the rolling device 268 of the plurality of coupling linkages 266 roll on the internal surface 270 and rotate the boom 220 about a longitudinal axis of the boom 220. The coupling assembly 264, as disclosed above, enable the boom to rotate +/−90 degrees left and right to allow for cutting of limbs on both sides of a tree and at odd angles. Such designs allow for the boom 220 and the implement 240 to rotate without significantly shifting the center of gravity from the static lateral position. Therefore allows for flexibility in operation while maximizing operator safety.

The operation of the machine 100 and the implement system 120 in conjunction with the implement control system 250 will now be explained with reference to FIG. 1-14. The machine 100, of the present disclosure, has two operational modes i.e. a working mode and a travelling mode. Prior to actuating any mode of operation, the operator may transmit a signal (to the implement control system 250) to ready the machine 100 for a particular mode of operation, by pressing a button/key. The signal transmitted by the implement control system 250 may be signal to activate an actuator (not shown) that is configured to either move the assembly of the carriage 200, the boom 220 and the implement 240 to the forward-most position (as illustrated in FIG. 15) or to move the assembly of the carriage 200, the boom 220 and the implement 240 to the rear-most position (as illustrated in FIG. 14).

In the event, the operator wants to actuate a working mode of the machine 100, the operator may transmit a signal to the implement control system 250 to actuate the actuator and move the assembly of the carriage 200, the boom 220 and the implement 240 to the forward-most position (as illustrated in FIG. 15). Only, after the assembly of the carriage 200, the boom 220 and the implement 240 is moved forward to its forward-most position, the implement control system 250 actuates the second hydraulic cylinder 166 to move the assembly of the carriage 200, the boom 220 and the implement 240 along a vertical direction as shown in FIG. 16 and FIG. 17.

After completion of the task at the work site 102, the operator may actuate a travel mode of the machine 100 so as to ready and subsequently move the machine 100 from one location to another on the work site 102. In such an event, the operator may transmit a signal to the implement control system 250 to actuate the actuator and move the assembly of the carriage 200, the boom 220 and the implement 240 to the rear-most position (as illustrated in FIG. 14). Only, after the assembly of the carriage 200, the boom 220 and the implement 240 is moved to its rear-most position, the implement control system 250 allows the machine 100 to traverse from one location to another on the work site 102.

The implement control system 250 may further be configured to establish whether the second hydraulic cylinder 166 is in its retracted position. In case, the controller 260 establishes that the second hydraulic cylinder 166 is in its retracted position, the controller 260 allows the assembly of the implement 240, boom 220 and carriage 200 to be slid rearward to its rear-most position as illustrated in FIG. 14. In case, the controller 260 establishes that the second hydraulic cylinder 166 is not in its retracted position, the controller 260 prevents the assembly of the implement 240, boom 220 and carriage 200 to be slid rearward to its rear-most position. By preventing sliding the assembly of the implement system 120 rearward when the second hydraulic cylinder 166 is not in its retracted position, the implement control system 250 prevents the implement system 120 from striking the ground or the rear of the machine 100. Thereby, improving operator safety and preventing potentially hazardous situations

INDUSTRIAL APPLICABILITY

Tree trimming machines include a large vehicle and a cutting device coupled to on an end of the boom. However, in restrictive areas, such as residential yards, municipal streets, golf courses, etc., trimming vegetation via the large tree trimming machine may not be possible. For example, the large tree trimming machines that support conventional extended-boom mounted cutting devices may not be able to access vegetation surrounding power lines that are located along a roadway or near residential plots. Accordingly, there is a need for a compact mobile tree-trimming apparatus with a small footprint to access the restrictive areas.

In an aspect of the present disclosure, the machine 100 is disclosed. The machine 100 includes the implement system 120. The implement system 120 includes the slew bearing assembly 140, the coupling structure 160, the roller assembly 180, the carriage 200, the boom 220 and the implement 240. The carriage 200 receives the boom and slides over the roller assembly 180 between the first position and the second position. The first position corresponding to a working mode of the machine 100 and the second position corresponding to a travelling mode of the machine 100. Prior to maneuvering the machine 100 from one location to another, the implement control system 250 of the implement system transmits a signal to the controller 260 to position the carriage 200 to the second position. This causes the assembly of the carriage 200, boom 220 and implement 240 to slide rearwards (as shown in FIG. 11b) such that the implement system 120 is centered at a position that is centered on the machine 100. Such an implement system with a sliding mechanism allows for more centered envelope of the overall machine and for adjusting the center of gravity of the machine white sitting on a trailer for transport. Further, the centering of the implement system 120 over the machine 100 makes it easier to steer the machine 100 than the traditional machines having a boom that extends a long distance from the front of the machine.

Figure 18:
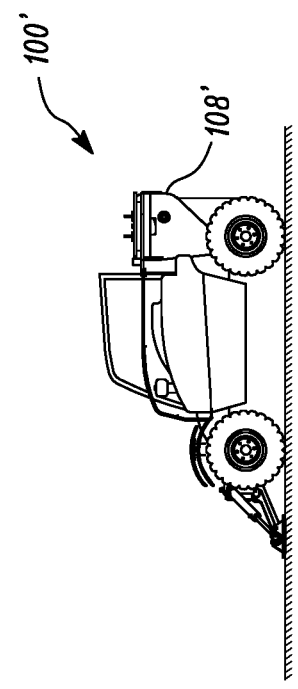
FIG. 18 illustrates a pre-existing machine having a pre-existing boom.
Figure 19:
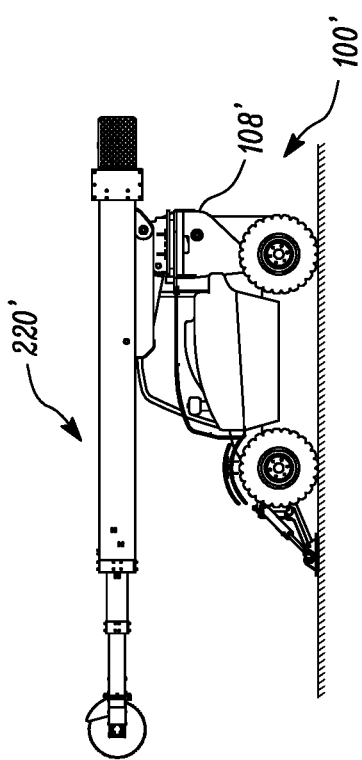
FIG. 19 illustrates the pre-existing machine wherein the pre-existing boom has been decoupled from a rear end of the pre-existing machine.
Figure 20:
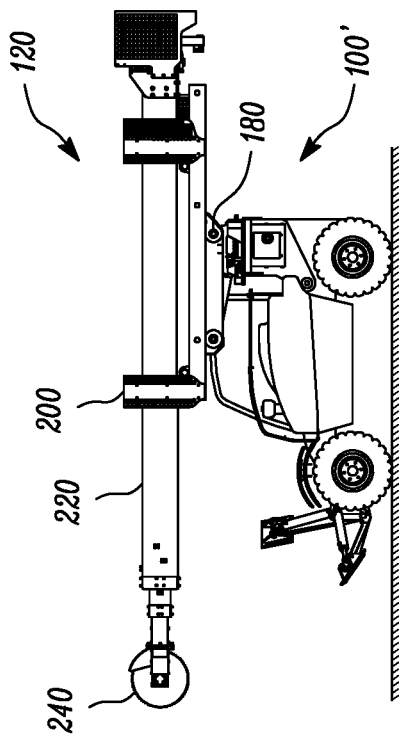
FIG. 20 illustrates a portion of the implement system (i.e. the roller assembly, the sliding carriage) mounted to the rear end of the pre-existing machine.
Figure 21:
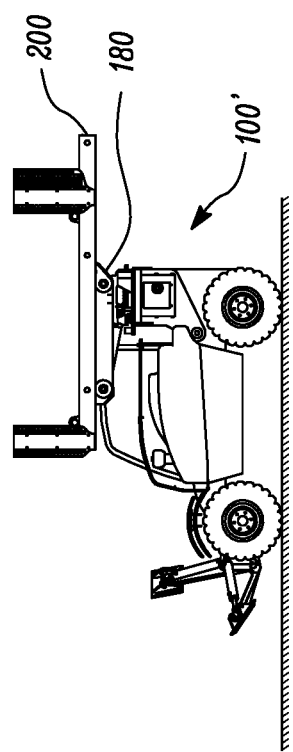
FIG. 21 illustrates the implement system mounted to the rear end of the pre-existing machine.
Figure 22:
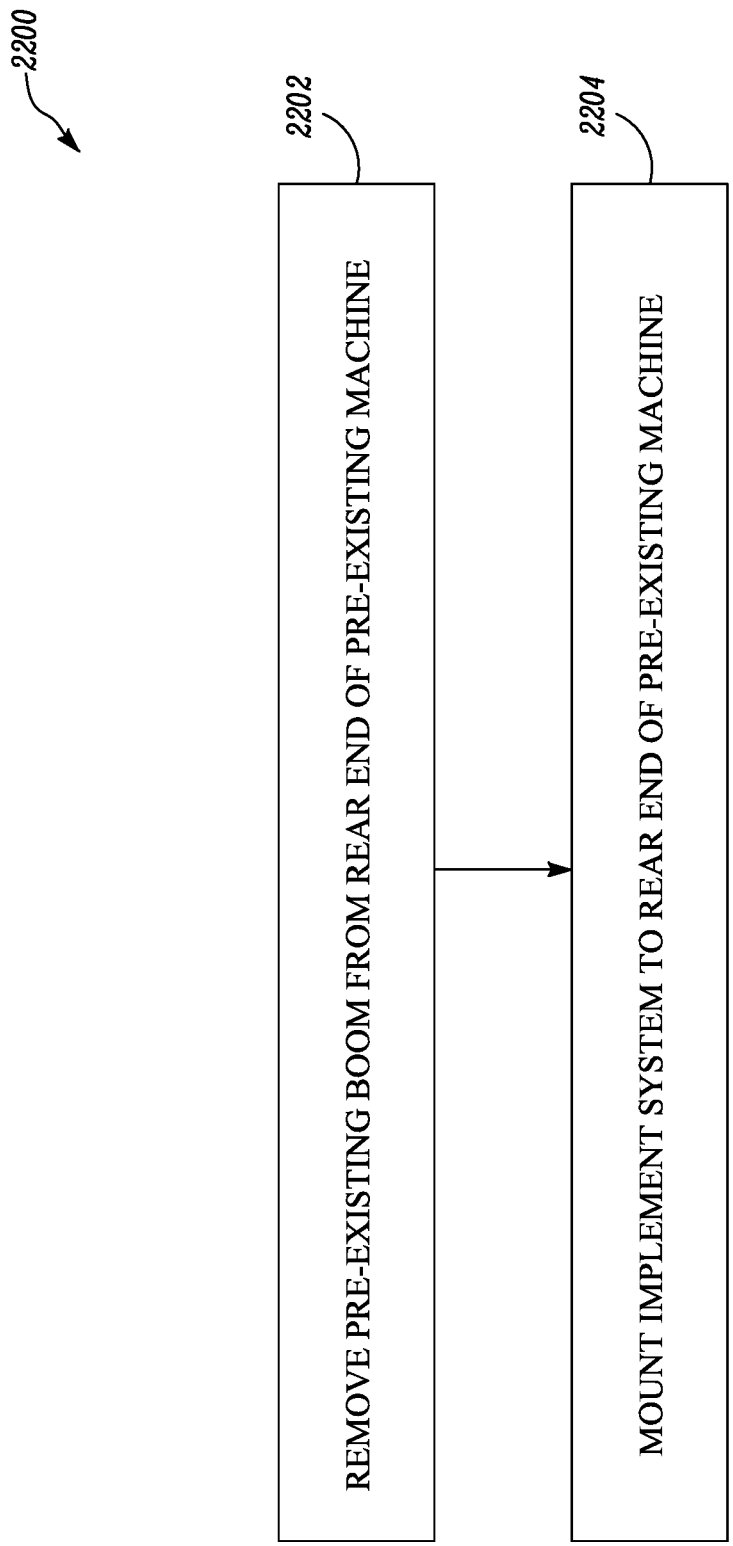
FIG. 22 depicts a method of retrofitting the pre-existing machine with the implement system in accordance with an embodiment of the present disclosure.

In another aspect of the present disclosure, a method 2200 for retrofitting a pre-existing machine is disclosed, as illustrated in FIG. 22. Referring to FIG. 18-FIG. 21, a pre-existing machine 100' is disclosed. The pre-existing machine 100' includes a pre-existing boom 220' coupled to a rear end 108' of the pre-existing machine 100', as illustrated in FIG. 18. The method 2200 includes removing the pre-existing boom 220' from the rear end 108' of the pre-existing machine 100' (Step 2202), as illustrated in FIG. 19. The method 2200 then includes mounting the implement system 120 to the rear end 108' of the pre-existing machine 100' (Step 2204). Referring to FIG. 20 and FIG. 21, mounting the implement system 120 includes mounting the roller assembly 180 to the rear end 108 'of the pre-existing machine 100', slidably engaging a carriage 200 with the roller assembly 180 such that the carriage 200 is configured to move along a longitudinal axis of the pre-existing machine 100' between the first position and the second position (as illustrated in FIG. 20) and coupling the boom 220 to the carriage 200 (as illustrated in FIG. 21).

Using this method 2200, a new implement system may be mounted to a pre-existing machine 100'. The new roller assembly and the carriage may be assembled onto the pre-existing machine 100' without making any alterations to the pre-existing machine 100'. Thus, a complete overhaul of the pre-existing machine 100' is avoided. Further, the option to retrofit the pre-existing machine 100' with the new implement system 120 obviates the need to buy the new machine 100 equipped with the implement system 120.

In yet another aspect of the present disclosure, the machine 100 having the implement control system 250 is disclosed. The implement control system 250 may include a series of interlocking safety switches that are employed to ensure that the operator cannot raise assembly of the implement 240, boom 220 and carriage 200 until the assembly of the implement 240, boom 220 and carriage 200 is slid forward to the forward/first position as illustrated in FIG. 15. Further, the implement control system 250 may also be configured to ensure that the operator cannot slide assembly of the implement 240, boom 220 and carriage 200 rearward until the assembly of the implement 240, boom 220 and carriage 200 is fully lowered (w.r.t. vertical direction) to the stowed position, as illustrated in FIG. 15. Such a control system enhances operator safety and prevents hazardous situations.

Further, the implement system 120 also includes the coupling assembly 264. This coupling assembly 264 enables the boom 220 and the implement 240 to rotate +/−90 degrees left and right to allow for cutting of limbs on both sides of a tree and at odd angles. This allow for the boom 220 and the implement 240 to rotate without significantly shifting the center of gravity from the static lateral position, therefore allowing for flexibility in operation while maximizing operator safety.

While aspects of the present disclosure have seen particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An implement system for a machine, the implement system comprising:
   a boom having a telescopic structure, the boom having a first end;
   an implement coupled to the first end of the boom;
   a roller assembly configured to be coupled to the machine;
   a carriage engaged with the roller assembly and coupled to the boom, the carriage configured to move linearly along a longitudinal axis of the machine between a first position and a second position; and
   a controller operably coupled to the boom, the controller configured to:
      allow vertical movement of the carriage and the boom when the carriage is at the first position; and
      prevent vertical movement of the carriage and the boom when the carriage is at a position other than the first position.

2. The implement system of claim 1 further comprising a hydraulic cylinder configured to move the carriage along the lateral axis of the machine.

3. The implement system of claim 1 further comprising a hydraulic cylinder having a piston rod end coupled to the carriage and a cylinder end coupled to the machine, the hydraulic cylinder configured to raise and lower the carriage in a vertical direction.

4. The implement system of claim 1 further comprising a slew bearing assembly, the slew bearing assembly coupled to the roller assembly and configured to rotate the roller assembly about a longitudinal axis of the slew bearing assembly.

5. The implement system of claim 1 wherein the carriage includes at least one annular structure to receive the boom.

6. The implement system of claim 5 further including a coupling assembly disposed between the annular structure and the boom, wherein the coupling assembly engages with the annular structure and the boom to facilitate a rotation of the boom about a longitudinal axis of the boom.

7. The implement system of claim 1 wherein the roller assembly includes at least one roller engaged with the carriage.

8. An implement system for a machine, the implement system comprising:
   a boom having a telescopic structure, the boom having a first end;
   an implement coupled to the first end of the boom;
   a roller assembly configured to be coupled to the machine; and
   a carriage engaged with the roller assembly and coupled to the boom, the carriage configured to move linearly along a longitudinal axis of the machine between a first position and a second position;
   wherein the roller assembly includes at least one roller engaged with the carriage, and wherein the carriage includes guide rails configured to engage with the at least one roller of the roller assembly, the guide rails and the at least one roller facilitate a linear movement of the carriage along the longitudinal axis of the machine.

9. A machine comprising:
a boom having a telescopic structure, the boom having a first end;
an implement coupled to the first end of the boom;
a frame having a rear end;
a roller assembly coupled to the rear end of the frame;
a carriage engaged with the roller assembly and coupled to the boom, the carriage configured to move linearly along a longitudinal axis of the machine between a first position and a second position; and
a controller operably coupled to the boom, the controller configured to:
allow vertical movement of the boom when the carriage is at the first position; and
prevent vertical movement of the boom when the carriage is at a position other than the first position.

10. The machine of claim 9 further comprising a hydraulic cylinder configured to move the carriage along the lateral axis of the machine.

11. The machine of claim 10 wherein the controller is configured to:
actuate the hydraulic cylinder and move the carriage to the first position; and
actuate the hydraulic cylinder and move the carriage to the second position.

12. The machine of claim 9 further comprising a slew bearing assembly, the slew bearing assembly coupled to the roller assembly and configured to rotate the roller assembly about a longitudinal axis of the slew bearing assembly.

13. The machine of claim 9 wherein the carriage includes at least one annular structure to receive the boom.

14. The machine of claim 13 further comprising a coupling assembly disposed between the annular structure and the boom, the coupling assembly engaging with the annular structure and the boom to facilitate a rotation of the boom about a longitudinal axis of the boom.

15. The machine of claim 9 wherein the roller assembly includes at least one roller engaged with the carriage.

16. The machine of claim 15 wherein the carriage includes guide rails configured to engage with the at least one roller of the roller assembly, the guide rails and the at least one roller facilitate a linear movement of the carriage along the longitudinal axis of the machine.

17. The machine of claim 9 further comprising a hydraulic cylinder having a piston rod end coupled to the boom and a cylinder end coupled to the machine, the hydraulic cylinder configured to raise and lower the boom in a vertical direction.

18. The implement system of claim 8, further comprising a hydraulic cylinder configured to move the carriage along the lateral axis of the machine.

19. The implement system of claim 8, further comprising a hydraulic cylinder having a piston rod end coupled to the carriage and a cylinder end coupled to the machine, the hydraulic cylinder configured to raise and lower the carriage in a vertical direction.

20. The implement system of claim 8, further comprising a slew bearing assembly, the slew bearing assembly coupled to the roller assembly and configured to rotate the roller assembly about a longitudinal axis of the slew bearing assembly.

* * * * *